United States Patent [19]

Eichenbaum et al.

[11] Patent Number: 4,744,631

[45] Date of Patent: May 17, 1988

[54] SINGLE MODE OPTICAL FIBER RIBBON CABLE

[75] Inventors: Bernard R. Eichenbaum, Basking Ridge, N.J.; Charles H. Gartside, III, Lilburn; Manuel R. Santana, Doraville, both of Ga.

[73] Assignee: American Telephone and Telegraph Company, AT&T Bell Laboratories, Murray Hill, N.J.

[21] Appl. No.: 91,327

[22] Filed: Aug. 31, 1987

Related U.S. Application Data

[63] Continuation of Ser. No. 697,055, Jan. 31, 1985, abandoned.

[51] Int. Cl.$^4$ ............................................. G02B 6/44
[52] U.S. Cl. ............................... 350/96.23; 350/96.24
[58] Field of Search ............... 350/96.20, 96.22, 96.23, 350/96.24; 523/173; 174/70 R, 110 SR

[56] References Cited

U.S. PATENT DOCUMENTS

| | | | |
|---|---|---|---|
| 3,864,018 | 2/1975 | Miller | 350/96 C |
| 3,937,559 | 2/1976 | Ferrentino et al. | 350/96 WG |
| 4,078,853 | 3/1978 | Kempf et al. | 350/96.23 |
| 4,110,001 | 8/1978 | Olszewski et al. | 350/96.23 |
| 4,142,776 | 3/1979 | Cherin et al. | 350/96.21 |
| 4,241,979 | 12/1980 | Gagen et al. | 350/96.23 |
| 4,259,540 | 3/1981 | Sabia | 174/23 C |
| 4,361,381 | 11/1982 | Williams | 350/96.23 |
| 4,645,298 | 2/1987 | Gartside, III | 350/96.23 |
| 4,701,016 | 10/1987 | Gartside, III et al. | 350/96.23 |

FOREIGN PATENT DOCUMENTS 2106266  4/1983  United Kingdom ............. 350/96.23

OTHER PUBLICATIONS

Katsuyama et al., "Single-Mode Optical-Fibre Ribbon Cable", Elect. Lett., 2/85, vol. 21, No. 4, pp. 134-135, 2/85.
Hardiman, "Pre-Connectorized Single Mode Fiber . . . ", Telephony, Jun. 3, 1985, pp. 54-60.
Levy et al., "The Next Generation of Flexgel TM Componos", Bell Tel. Rec., Jul./Aug. 1983, pp. 30-33.
Foord et al., "Principles of Fibre-Optical Cable Design", Pro IEE, vol. 123, No. 6, Jun. 1976, pp. 597-602.
*IEEE Global Telecommunications Conference,* Atlanta, Georgia, Nov. 26-29, 2984 [sic] 1984, "High Performance Single-Mode Lightguide Media", by C. H. Gartside III et al, pp. 1382-1385.
*Proceedings-Eighth International Fiber Optic Communications and Local Area Networks Exposition in the USA,* Las Vegas, Nevada, Sep. 17-21, 1984, pp. 18-23.
*Optical Fiber Communications,* 28 Feb.-2, Mar. 1983, New Orleans, La., TU12 (3 pages).
"Recent Developments In Mini-Unit Cable", *International Wire & Cable Symposium Proceedings,* D. Lawrence et al., 1983, pp. 301-307.
"Fiber Ribbon Optical Transmission Lines", *The Bell System Technical Journal,* vol. 53, R. D. Standley, 1974, pp. 1183-1185.
"Fiber-Optic Array Splicing with Etched Silicon Chips", *The Bell System Technical Journal,* vol. 57, No. 1, C. M. Miller, 1978, pp. 75-90.
"Adhesive Sandwich Optical Fiber Ribbons", *The Bell System Technical Journal,* vol. 56, No. 6, M. J. Saunders et al., 1977, pp. 1013-1014.
*Advances In Ceramics,* vol. 2, B. Bendow et al., editors, pp. 27-39, 1981.
*Optical Fiber Telecommunications,* S. E. Miller et al., editors, pp. 38-53, 1979.

*Primary Examiner*—William L. Sikes
*Assistant Examiner*—Brian M. Healy
*Attorney, Agent, or Firm*—Eugen E. Pacher

[57] ABSTRACT

A single mode optical fiber ribbon cable is disclosed. In preferred embodiments, the cable comprises a filling compound having a critical yield stress less than about 70 Pa at 20° C. and/or fibers having a coating that comrises a low modulus (less than about $1.5 \cdot 10^6$ Pa at 20° C.) inner coating and a high modulus (more than $10^8$ Pa at 20° C.) outer coating. Communication cable according to the invention can have low cabling loss, is adapted for array joining, can have high fiber density, and can advantageously be used in short-haul applications such as for metropolitan trunk lines or loop, as well as for long-haul applications.

7 Claims, 1 Drawing Sheet

SINGLE MODE OPTICAL FIBER RIBBON CABLE

This application is a continuation of application Ser. No. 697,055, filed Jan. 31, 1985, now abandoned.

FIELD OF THE INVENTION

This invention pertains to the field of optical fiber cables.

BACKGROUND OF THE INVENTION

The optical telecommunication field has undergone very rapid development, to the extent that commercial fiber-based systems are now being installed routinely. However, the technology is still experiencing major shifts in direction.

For instance, whereas first generation fiber systems almost invariably were designed to operate at a wavelength of about 0.8 $\mu$m, there is now growing interest in systems having an operating wavelength of about 1.3 $\mu$m, to take advantage of the loss window that exists in silica-based fiberguide in that wavelength region. Even lower loss is obtainable at about 1.55 $\mu$m. It is expected that some future optical transmission systems will operate at that wavelength, pending the development of economical sources and other components for use at 1.55 $\mu$m.

A further example of a major shift in the direction of the technology is the change from multimode (MM) to single mode (SM) technology. This change is primarily driven by the demand of the marketplace for higher and higher bandwidths.

As is well known to the practitioner, optical fibers can be designed to either support a multiplicity of guided modes of electromagnetic radiation at the design wavelength, or to support only a single guided mode at that wavelength. For background on this as well as other aspects of optical fiber telecommunications, see, for instance, *Optical Fiber Telecommunications,* S. E. Miller and A. G. Chynoweth, editors, Academic Press, 1979, especially pages 38–53.

MM fibers typically have a fiber core diameter that is large compared to the operating wavelength of the fiber. The fiber core is the central region of the fiber in which the refractive index of the material is higher than in the surrounding fiber region, the cladding. A typical core diameter of MM fiber is about 50 $\mu$m, with 125 $\mu$m being a typical outside diameter of currently used fiber. Because of the relatively large size of the core, it is comparatively simple to assure core-to-core alignment when joining MM fibers, and a variety of MM connector designs are in use.

SM fiber theoretically can have much higher bandwidth than MM fiber, due, inter alia, to the absence of mode dispersion in the former. For that reason, SM fibers are advantageous for long-haul high transmission rate applications. SM fiber for use at 1.3 $\mu$m has been developed, is commercially available, and is being installed.

SM fibers have a core diameter that is typically much smaller than that of MM fiber. At this time, the diameter of a typical exemplary SM fiber core is about 9 $\mu$m. In order to achieve the low splice loss desirable in long-haul communications links, it is typically necessary to align the two abutting cores of SM fibers to within less than about one micrometer. Such joints currently generally require active alignment of the cores, e.g., alignment while monitoring the amount of radiation lost at the junction or transmitted into the receiving fiber.

Optical fiber is currently almost invariably installed in the form of multifiber cables. For connection of a single user installation to the loop, the cable may be a simple one, containing as few as two fibers. On the one hand, in loop or trunk applications or the like, the cables typically have a much higher fiber count.

Several types of optical fiber cables have been developed, including loose tube and other stranded fiber cables, and ribbon cable. For a description of a loose tube cable see, for instance, D. Lawrence and P. Bark, *International Wire and Cable Symposium Proceedings,* 1983, pp. 301–307. Stranded fiber cable designs have been found suitable for MM as well as for SM fiber, and SM fiber cable of this type, including high fiber count cable, is commercially available. Indeed, Lawrence et al report that other cable types have been found unsuitable for high fiber count SM fiber cable.

Other variants of stranded cable are exemplified by U.S. patent application Ser. No. 518,145, filed July 28, 1983, now U.S. Pat. No. 4,645,298, and by U.S. Pat. No. 4,361,381. The former shows fibers stranded onto a strength member within a loose tube, and the latter is an example of a slotted core cable.

Currently available MM fiber ribbon cable comprises one or more fiber ribbons, with each ribbon comprising a multiplicity of fibers (presently typically 12) embedded in a thin, flexible supporting medium. See, for instance, R. D. Standley, *The Bell System Technical Journal,* Vol. 53, pp. 1183–1185 (1974). See also U.S. Pat. No. 4,078,853, issued Mar. 14, 1978 to R. A. Kempf et al, as well as U.S. Pat. No. 3,937,559, issued Feb. 10, 1976, and U.S. Pat. No. 4,110,001, issued Aug. 29, 1978. Commercially available ribbon cables contain up to 12 ribbons, yielding a total fiber count of up to 144 fibers. This, of course, is not necessarily the highest fiber count achievable with ribbon cables, and the count could be increased if this appears indicated.

MM fiber ribbon cable, the only type of ribbon cable known to the prior art, has a number of attractive features. One of the most important is its potential for array connectorization. Array connectors are well known to those skilled in the art. See, for instance, U.S. Pat. No. 3,864,018, incorporated herein by reference. Such connectors can be factory installed, and can drastically reduce the time required per fiber connection, as compared to single fiber joining techniques of the type commonly used with stranded cable.

A further advantageous feature of MM ribbon cable is its efficient use of duct or conduit space. For a given (relatively high) fiber count, a ribbon cable can have a significantly smaller outside diameter than a stranded cable, and therefore greater fiber density, than an equal fiber count stranded cable.

Despite these and other advantages of the optical fiber ribbon cable, the design has not been widely adopted by the industry. To the best of our knowledge, only one manufacturer has supplied significant quantities of MM ribbon cable. And the market share of ribbon cable has declined recently, due primarily to the increased use of SM fiber cable, which has exclusively been stranded cable.

DEFINITIONS

An "optical fiber" or "lightguide" is a filamentary glass body, typically comprising silica as a major constituent, having a core region and, surrounding the core and in intimate contact therewith, one or more cladding regions, with the core having a higher index of refraction than at least the cladding region immediately surrounding the core. Typically optical fiber is coated with one, two, or possibly even more, layer(s) of coating material(s).

A "single mode" optical fiber is constructed to guide, at the operating wavelength (or wavelengths) of the fiber, only a single mode of electromagnetic radiation. This mode is the fundamental mode, usually designated $LP_{01}$. In ordinary (not polarization-preserving) SM fiber the fundamental mode actually consists of two degenerate modes differing in polarization, whereas in polarization-preserving fibers the fundamental mode may be a mode having a single polarization. Both of these possibilites are encompassed by the term "single mode" fiber.

An "optical fiber cable" is an article comprising a sheath surrounding a multiplicity of optical fibers. An optical fiber cable typically also comprises one or more strength members, and may comprise additional layers of sheathing, including metal sheathing, and, also optionally, a filling compound within the sheath.

An optical fiber "ribbon" is an article comprising a multiplicity of optical fibers, the fibers arranged substantially parallel to each other, typically regularly spaced, the fibers held within a flexible envelope, e.g., a flexible laminated structure. Although, in current practice, ribbons are generally flat, this is not necessarily the case, and curved or otherwise shaped ribbon cross sections are in principle possible.

An "optical fiber ribbon cable" is an optical fiber cable comprising one or more fiber ribbons. It may also comprise other transmission media, e.g., metal conductors.

SUMMARY OF THE INVENTION

Disclosed is a SM optical fiber ribbon cable, that is to say, a fiberguide cable comprising at least one optical fiber ribbon, the fibers of the ribbon being SM fiberguides at least at one operating frequency.

In a currently preferred embodiment of the inventive cable, at least some, typically all, of the SM fibers are individually enclosed within a multiple coating comprising a low modulus inner coating and a high modulus outer coating (typically less than about $10^7$ Pa, preferably between about $2.5 \cdot 10^5$ and about $15 \cdot 10^5$ Pa, and more than $10^7$ Pa, preferably more than $10^8$ Pa, respectively, at 20° C.). Such coatings are well known in the art. See, for instance, U.S. Pat. No. 4,324,575, and R. E. Ansel et al, *Advances in Ceramics*, Vol. 2, B. Bendow et al, editors, pp. 27–39 (1981). In a currently preferred embodiment, the cable comprises a filling compound, preferably a grease-like filling compound having low critical yield stress. Such a filling compound is disclosed in the concurrently filed U.S. patent application Ser. No. 697,054, now U.S. Pat. No. 4,701,016, entitled "Thixotropic Grease Composition and Articles Comprising Same", which is incorporated herein by reference. As discussed in detail in the incorporated patent application, it has been found that, in order to obtain low microbending loss in cabled fiber, it is often important for the filling compound to have a very low critical yield stress. At least with current SM fiber designs, this is generally even more important at long wavelengths, e.g., at about 1.55 μm, than it is at shorter wavelengths, e.g., at about 1.3 μm.

We believe that a filling compound for use in cable according to the invention should have a critical yield stress of less than 140 Pa, preferably at most 70 Pa or even 35 Pa, at 20° C. Currently preferred compositions are disclosed in the incorporated U.S. patent application.

Cables according to the invention can be used in long-haul communication links, e.g., in intercity trunk lines. However, cable according to the invention can also advantageously be used in applications that are not of the long-haul type. For instance, SM ribbon cable can be used in metropolitan trunk lines, or in loop applications. In such applications, span length typically is relatively short, e.g., significantly less than 100 km, and fiber count typically is high. The SM fiber ribbon cables for such "short-haul" applications are expected to typically be joined by means of array connectors. In practice, the cable will often be supplied carrying factory-installed array connectors, e.g., Si array chips.

We consider the realization that, contrary to prevailing industry practice, SM fiber ribbon cable can advantageously be used in metropolitan trunk lines, for loop and for other short-haul applications, to be an important aspect of this invention. SM fiber ribbon cable has significant advantages for such applications, and we expect that the herein-disclosed extension of the ribbon design to SM fiber cable will be emulated by others in the industry.

DETAILED DESCRIPTION

Figure 1:
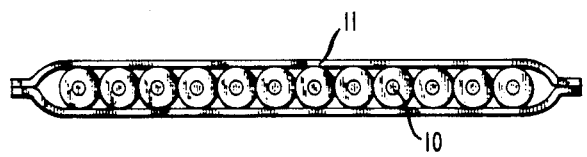
FIG. 1 shows schematically and in cross section an exemplary fiber ribbon.

SM fiber has generally been viewed as a long-haul medium due to its potentially very high bit rate. For traditional long-haul applications, SM fiber cables typically do not need to have very high fiber counts. On the other hand, in such applications, it is considered to be imperative that fiber joints introduce minimal loss into the transmission path, and splices having routinely less than 0.1 dB loss have been developed. The low installed loss of SM fiber currently make possible typical repeater spacings of about 30 km or more in long-haul applications.

On the other hand, in metropolitan trunk and in loop and other relatively short-haul applications, the loss requirements may be less stringent than in long-haul applications, and we believe that higher joint losses could typically be tolerated. However, although such systems may not have to meet as stringent installed-loss requirements as long-haul systems, the need (or desire) for high bit-rate channels remains. And furthermore, in order to accommodate current and anticipated demand, the above referred to short-haul applications often will require high fiber count fiber transmission media.

The need for high bit rate channels can in principle be met by stranded SM fiber cable. However, we are disclosing here that, contrary to present industry belief, SM ribbon cable can be used in at least some metropolitan (and other short-haul) applications more advantageously than prior art stranded cable.

SM ribbon cable not only can meet the bit rate requirements to the same extent as stranded SM cable, but at least some types of high fiber count SM ribbon cable can be produced very economically, and can have a higher fiber density than stranded cable. The last point is often a very significant one, since in metropolitan applications fiber cables frequently have to be placed into crowded ducts or conduits. In such situations a small diameter cable is a distinct advantage, and for a given (high) fiber count, ribbon cable frequently is of significantly smaller diameter than stranded cable.

Furthermore, ribbon cables lend themself to mass-joining. In the applications under discussion here, the somewhat higher losses of array-joints (e.g., of factory-installed silicon array chips), as compared to the losses achievable in single fiber joints, often can be readily accepted. Use of mass-joining results typically in a considerable reduction of joining time, and thus produces cost savings. We are using the term "joint" herein to refer collectively to "splice" and "connector".

Although a significant field of application for SM ribbon cable is in metropolitan trunks, loop, and the like, SM ribbon cable can also be used in long-haul applications, since its bandwidth and, as we have discovered, its installed loss can be as low as that of stranded cable. In such applications, individual fiber joining is typically used. After peeling apart the protective laminae of a ribbon, individual fibers may be joined by known fusion, bonding, or mechanical techniques.

SM fiber ribbon can be produced using substantially the same known techniques that are used to produce MM fiber ribbon. For instance, it can be manufactured by packaging an appropriate number, e.g., 12, fibers between two poly(ethylene terephthalate) tapes backed with pressure sensitive acrylic or silicone adhesive. See, for instance, M. J. Saunders et al, *The Bell System Technical Journal*, Vol. 56(6), pp. 1013–1014 (1977). An exemplary fiber ribbon is schematically shown in cross section in FIG. 1, wherein 10 indicates the optical fibers, and 11 the protective sheathing consisting of two strips of adhesive-backed plastic tape.

One or more SM fiber ribbons may be incorporated into a cable. Typically the ribbons are stacked into a rectangular array, the array is twisted, and a loose tube is formed around the ribbon stack. For instance, the stack can comprise 12 ribbons of 12 fibers each, and the loose tube can be a plastic tube extruded over the ribbons. Strength members, and further protective sheaths, including metal sheaths, can be applied over the core tube by known methods.

Figure 2:
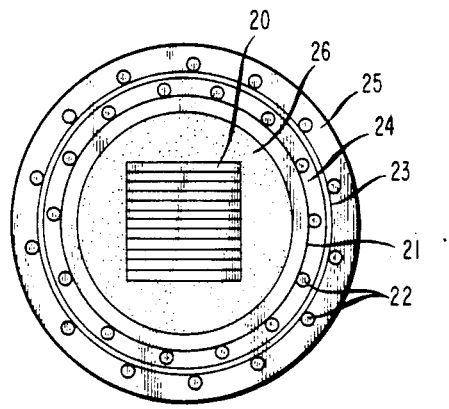
FIGS. 2 and 3 schematically depict exemplary ribbon cables.

An exemplary embodiment is schematically shown in cross section in FIG. 2. Ribbon stack 20 (individual fibers not shown) is loosely surrounded by an inner tube 21, which in turn is surrounded by a first protective sheath 24, e.g., a high-density polyethylene sheath. The first protective sheath is shown to be surrounded by a polyester tape 23, and by second protective sheath 25. Embedded in both 24 and 25 are strength members 22, for instance, steel wire, fiber glass roving, Kevlar yarn, or fiber glass/epoxy composites. The space between 20 and 21 is shown filled with a water blocking filling compound 26.

Figure 3:
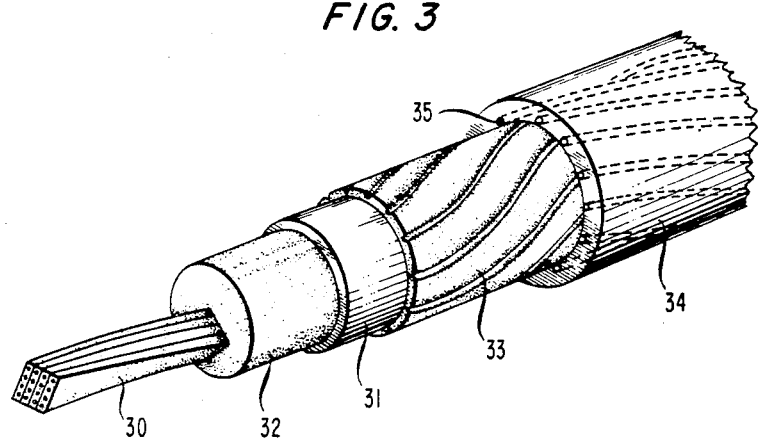

The cable design depicted in FIG. 2 is intended to be exemplary only, and other designs are also contemplated. For instance, FIG. 3 shows a further ribbon cable, wherein twisted ribbon stack 30 is contained within inner tube 31, with a filling compound 32 substantially filling the void between 30 and 31. A bedding layer 33 separates outer tube 34 and the inner tube, with strength members 35 embedded in 34. All the contemplated cable designs can be manufactured by techniques that are well known to those skilled in the art.

Cable according to the invention can be either air core or filled with a filling compound, with the latter being currently preferred. It is currently anticipated that in preferred embodiments filled cable according to the invention will typically comprise a thixotropic filling compound having a very low critical yield stress. Such compounds are disclosed in previously referred to U.S. patent application C. H. Gartside et al Ser. No. 697,054, now U.S. Pat. No. 4,701,016. The filling compound preferably has a critical yield stress less than about 70 Pa at 20° C.

We have found that SM ribbon cable filled with a thixotropic filling compound according to the above referred to patent application can have very low average cabling loss, i.e., the average fiber loss increase associated with cable manufacture. Typically the average cabling loss at 1.55 $\mu$m and 20° C. is less than about 0.1 dB/km, even less than 0.05 dB/km, if a preferred filling compound is used. On the other hand, when using a commercially available exemplary prior art filling compound having a relatively high critical yield stress (about 140 Pa at 20° C.), the average cabling loss of fiber of the same type at 1.55 $\mu$m was about 0.2 dB/km.

Substantially any SM fiber, including fiber with depressed index cladding (i.e., fiber in which the refractive index of the cladding region surrounding the core is less than that of $SiO_2$) can in principle be used in cable according to the invention. A currently preferred fiber has a dual coating, with a relatively compliant (modulus typically less than about $1.5 \cdot 10^6$ Pa at 20° C.) inner coating, and a relatively hard (modulus typically more than about $10^8$ Pa at 20° C.) outer coating. Such fiber can have low microbending loss, and therefore also low cabling loss.

For applications in which it is not critical to achieve the lowest possible splicing loss, e.g., in most metropolitan and loop installations, array joining methods (i.e., methods which result in substantially simultaneous establishment of optical transmission paths in a multiplicity of fiber pairs) can be advantageously used. In particular, in such applications preterminated ribbon cable is currently preferred. Array splice systems are known (see, for instance, U.S. Pat. Nos. 3,864,018 and 4,142,776). A currently preferred approach uses grooved silicon array chips, of the type described in, for instance, C. M. Miller, *The Bell System Technical Journal*, Vol. 57(1), pp. 75–90 (1978). Ribbon joints using the preferred connectors can have a mean loss of less than 1 dB/fiber. For instance, in an experimental joining series involving 100 twelve-fiber ribbon SM arrays, a mean splice loss of less than about 0.5 dB was observed. Array joints of course can also be used to join fan-outs to ribbons.

In summary, we have disclosed here that a cable type that was, despite its many advantageous features, not widely adopted by the industry for MM fiber cables, and that was generally considered to be unsuitable for SM fiber cables and was not used for such cables, can, contrary to the teachings of the prior art and the opinion of those skilled in the art, be advantageously used for SM fiber cable. Contrary to current practice, which is directed towards achieving the lowest possible transmission loss for SM fiber communication channels, we are also teaching that there exist numerous applications for which it is not only not necessary to provide fiber communications channels having the lowest attainable loss but that overall advantages can result from the use of SM optical fiber ribbon cable in such cases. We expect that these disclosures will result in a reconsideration of the industry's cabling plans and that the disclosed practice will be emulated by the industry, resulting in a change of cable technology. In particular, we expect that SM fiber ribbon cables, especially pre-connectorized SM fiber ribbon cables, will be widely used in metropolitan trunk, loop, and other relatively short-haul applications. We also expect that SM ribbon cable will find use in intercity trunk lines and other long-haul applications.

SM fiber ribbon cable according to the invention is currently expected to contain fibers having a relatively long operating wavelength, typically at or above about 1.3 μm. "Dual window" cables, i.e., cables containing fibers having two (or more) operating wavelengths (e.g., 1.3 and about 1.55 μm) are also contemplated. Communications systems operating at both 1.3 and 1.55 μm are a particular case of wavelength multiplexed systems, and cable according to the invention is considered to be well adapted for use in such systems. We believe that, for instance, in loop applications multiplexing of signals onto SM fiber ribbon cable will be an advantageous method for achieving the high capacities and great flexibility that will likely be required of such communications paths in the future. It will be understood that wavelength multiplexed systems can have a multiplicity of operating wavelengths in one or both of the low loss regions of the fiber. With current signal sources the wavelengths typically have to differ by at least about 10–15 nm, but improvements in source stability and line width are expected to make possible even closer wavelength spacing, of the order of 1 nm. Increases in systems capacity are, in principle, also obtainable by means of coherent detection. We believe that fiber cable according to the invention can be advantageously used in wavelength multiplexed systems as well as in coherent systems.

What is claimed is:

1. An optical fiber cable comprising at least one optical fiber ribbon contained within a sheath, the ribbon comprising a multiplicity of optical fibers maintained substantially parallel with each other within a flexible sheathing, the optical fibers adapted for operation at least at one predetermined operating wavelength, CHARACTERIZED IN THAT the optical fibers have a first and a second operating wavelength of about 1.3 μm and about 1.55 μm, respectively, with the optical fibers being single mode optical fibers at both the first and the second operating wavelength, the optical fiber cable having an average cabling loss of at most about 0.1 dB/km at both the first and the second operating wavelength.

2. Optical fiber cable of claim 1 having voids between the sheath and the optical fiber ribbon, a filling material at least partially filling the voids, the filling material having a critical yield stress of at most 70 Pa at 20° C.

3. Optical fiber cable of claim 1, wherein at least some of the optical fibers are coated optical fibers, with the fiber coating comprising at least a first coating and a second coating, the first coating surrounding the optical fiber and having a modulus of at most about $1.5 \cdot 10^6$ Pa at 20° C., and the second coating surrounding the first coating and having a modulus of more than about $10^8$ Pa at 20° C.

4. Optical fiber cable of claim 1, wherein the optical fibers comprise a core region and an inner cladding surrounding the core and being in intimate contact therewith, the inner cladding having a refractive index, the inner cladding refractive index being lower than the refractive index of silica.

5. Optical fiber cable of claim 1, further comprising means for joining a multiplicity of fibers of at least one fiber ribbon to a multiplicity of other fibers.

6. Optical fiber cable of claim 5, wherein the fiber joining means comprise a grooved silicon chip, each fiber of the multiplicity of fibers supported within a groove.

7. An optical fiber cable, the cable comprising at least one optical fiber ribbon contained within a sheath, with voids between the optical fiber ribbon and the sheath, a filling material at least partially filling the voids, the filling material having a critical yield stress of less than about 70 Pa at 20° C., the optical fiber ribbon comprising first and second plastic laminate elements, with a multiplicity of optical fibers maintained between the laminate elements, the laminate elements being mutually adhered, the optical fibers being maintained substantially parallel to each other, at least some of the optical fibers being coated optical fibers, the coating comprising at least an inner coating and an outer coating, the inner coating contactingly surrounding the optical fiber and having a modulus of less than $1.5 \times 10^6$ Pa at 20° C., and the outer coating surrounding the inner coating and having a modulus greater than $10^8$ Pa at 20° C., the optical fibers being single mode optical fibers at operating wavelengths of about 1.3 μm and about 1.55 μm, the cable having an average cabling loss of at most about 0.1 dB/km at both the operating wavelengths.

* * * * *